US012614862B2

(12) United States Patent
Khawand et al.

(10) Patent No.: US 12,614,862 B2
(45) Date of Patent: Apr. 28, 2026

(54) HYBRID ANTENNA ARRAY

(71) Applicant: Microsoft Technology Licensing, LLC, Redmond, WA (US)

(72) Inventors: Charbel Khawand, Sammamish, WA (US); Apoorva Sharma, Sammamish, WA (US); Andrew James Hillenius, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 18/209,818

(22) Filed: Jun. 14, 2023

(65) Prior Publication Data

US 2024/0421498 A1 Dec. 19, 2024

(51) Int. Cl.
*H01Q 21/06* (2006.01)
*H01Q 5/25* (2015.01)

(52) U.S. Cl.
CPC ............. *H01Q 21/065* (2013.01); *H01Q 5/25* (2015.01)

(58) Field of Classification Search
CPC ........ H01Q 1/243; H01Q 1/38; H01Q 21/065; H01Q 21/28; H01Q 9/0414; H01Q 3/24; H01Q 1/2283; H01Q 21/24; H01Q 9/0407; H01Q 1/246; H01Q 1/48; H01Q 5/385; H01Q 5/40; H01Q 9/0442; H01Q 9/42; H01Q 1/245; H01Q 9/40; H01Q 1/2266; H01Q 1/2291; H01Q 13/24; H01Q 3/40; H01Q 25/001; H01Q 5/42; H01Q 9/045; H01Q 1/526
See application file for complete search history.

(56) References Cited

U.S. PATENT DOCUMENTS 6,501,427 B1 12/2002 Lilly
2007/0225034 A1* 9/2007 Schmidt ................. H01Q 1/241 455/552.1
2019/0027822 A1* 1/2019 Ayala Vazquez ........ H01Q 1/42
2019/0081394 A1* 3/2019 Edwards ............. H04M 1/0266
2020/0287287 A1* 9/2020 Ying .................... H01Q 9/0407
2021/0119346 A1 4/2021 Sur
2022/0094061 A1* 3/2022 Yong ...................... H01Q 5/385
(Continued)

OTHER PUBLICATIONS

International Search Report and Written Opinion received for PCT Application No. PCT/US2024/031331, mailed on Sep. 24, 2024, 12 pages.

*Primary Examiner* — Golam Sorowar
(74) *Attorney, Agent, or Firm* — Ray Quinney & Nebeker P.C.; Paul N. Taylor

(57) ABSTRACT

The disclosed technology is generally directed to a hybrid antenna module. In one example of the technology, an apparatus comprises a first substrate that includes a first antenna module and a controller. The first antenna module includes: antenna patches; floating patches; and switches. The controller is configured to cause the first antenna module to selectively operate in a first mode and a second mode such that at least a portion of the antenna patches and at least a portion of the floating patches are switched together via the switches in the second mode and not in the first mode, and in which a resonant antenna frequency of the first antenna module is controlled at a first frequency in the first mode and at a second frequency in the second mode. The second frequency is different from the first frequency.

20 Claims, 4 Drawing Sheets

(56) References Cited

U.S. PATENT DOCUMENTS

| | | | | |
|---|---|---|---|---|
| 2022/0247073 | A1* | 8/2022 | Choi | G01S 5/02 |
| 2024/0106126 | A1* | 3/2024 | Zhou | H01Q 1/2283 |
| 2024/0304999 | A1* | 9/2024 | Zhu | H01Q 9/0457 |
| 2025/0158290 | A1* | 5/2025 | Coelho De Souza | H01Q 21/08 |

* cited by examiner

HYBRID ANTENNA ARRAY

BACKGROUND

A phased array antenna is an array of antennas which projects a beam of radio waves that can be steered to point in different directions without moving the antennas. There are many different types of phased array antennas.

An ultra-wideband (UWB) phased array antenna is a phased array of UWB antennas, where a UWB antenna is an antenna with a fractional bandwidth greater than 0.2 and a minimum bandwidth of 500 MHz. UWB antennas have many applications, including voice and data transmission using digital pulses, allowing a very low-powered and relatively low-cost signal to carry information at very high data rates within a restricted range.

A millimeter wave (mmWave) phased array antenna is a phased array of mmWave antennas, where a mmWave antenna uses a spectrum in the band with wavelengths between 10 millimeters and 1 millimeter, and have many applications, such as high-speed, point-to-point wireless local area networks (WLANs) access, broadband access, and for a variety of services on mobile and wireless networks, enabling higher data rates than at lower frequencies, such as Wi-Fi.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to a hybrid antenna module. In one example of the technology, an apparatus comprises a first substrate that includes a first antenna module and a controller. The first antenna module includes: a first plurality of antenna patches; a first plurality of floating patches; and a first plurality of switches. The controller is configured to cause the first antenna module to selectively operate in a first mode and a second mode such that at least a portion of antenna patches in the first plurality of antenna patches and at least a portion of the floating patches in the first plurality of floating patches are switched together via the plurality of switches in the second mode and not in the first mode, and in which a resonant antenna frequency of the first antenna module is controlled at a first frequency in the first mode and at a second frequency in the second mode. The second frequency is different from the first frequency.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

A device includes one or more hybrid antennas arrays. Each hybrid antenna array effectively has two more antenna structures on one module that is on one substrate. The hybrid antenna array is capable of acting in two or more different antenna modes, where the different antenna modes may include, for example, a mmWave mode, a UWB mode, a 60 GHz antenna mode, a Bluetooth mode, or another suitable antenna mode. For instance, in one example, a mobile device has a hybrid antenna array that is capable of acting in mmWave mode and UWB mode, rather than having one separate mmWave antenna module on one substrate and another separate UWB antenna module on another substrate. Software logic in the device controls which antenna mode the hybrid antenna array is operating in at any particular time.

For instance, a hybrid antenna array capable of operating in both mmWave mode and UWB mode has a number of mmWave antenna patches, a number of floating patches, and a number of switches. When the device is operating in mmWave mode, the switches are open, and the mmWave antenna patches are not coupled to other patches by the switches. The mmWave antenna patches operate as they would in a standard mmWave array, including being controlled to operate at an appropriate resonant frequency for a mmWave array.

When the software logic causes the device to operate in UWB mode, the switches close to form two or more UWB antennas, where each UWB antenna includes two of the mmWave antenna patches coupled together via one of the floating patches, where the floating patches are coupled to the mmWave antenna patches via switches. The software logic controls the hybrid antenna array to operate as a UWB antenna array, including being controlled to operate at the appropriate resonant frequency for a UWB array.

Illustrative Systems

Figure 1:
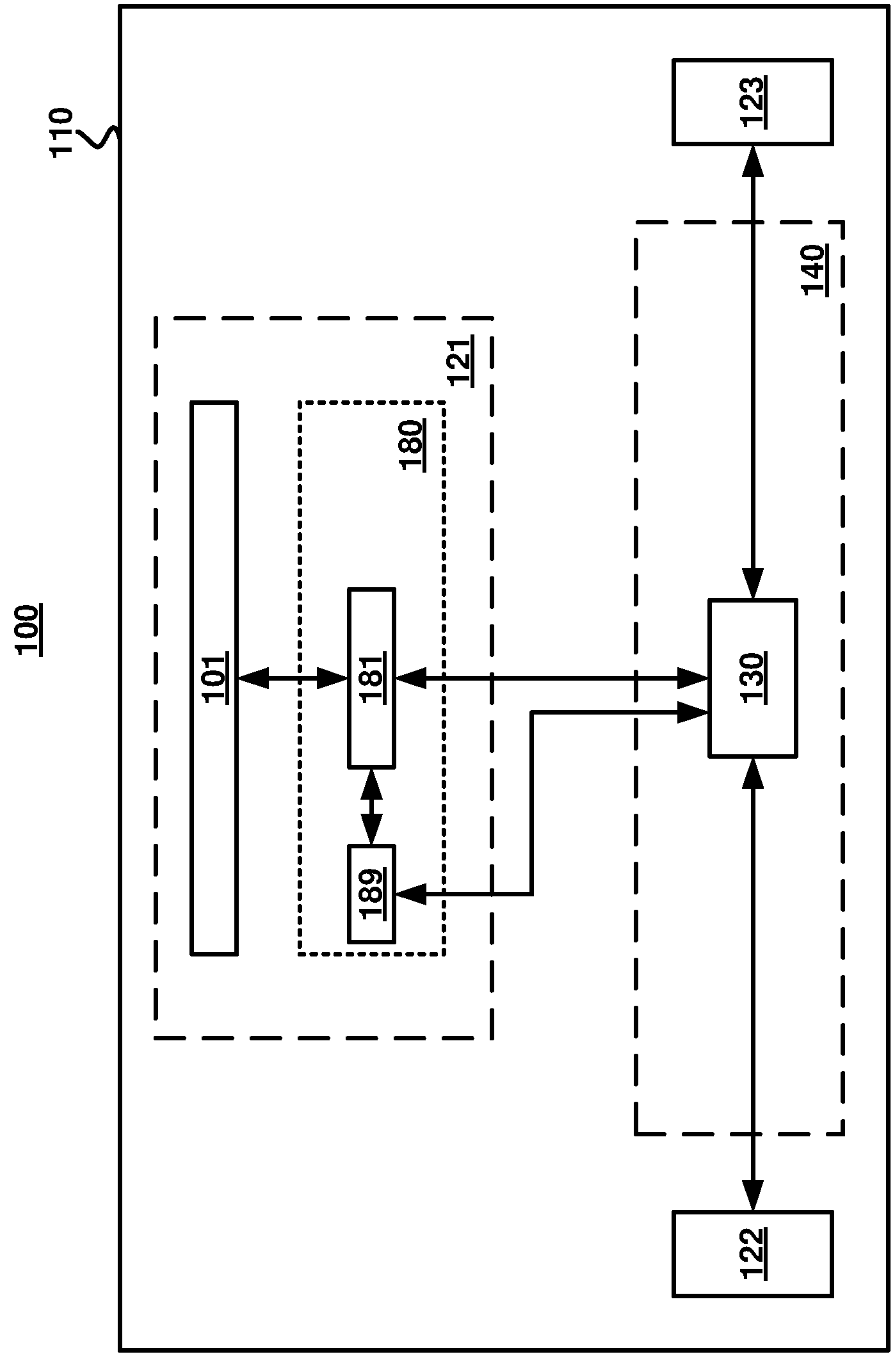
FIG. 1 shows a block of an example device that includes one or more hybrid antenna modules.

FIG. 1 shows an example of a device (100). FIG. 1 and the corresponding description of FIG. 1 in the specification illustrate an example device for illustrative purposes that does not limit the scope of the disclosure. Device 100 is described as follows in accordance with some examples.

Device 100 includes outer layer 110, hybrid module 121, hybrid module 122, hybrid module 123, controller 130, and chassis 140. Device 100 is a mobile device or other suitable device that uses at least one antenna array. Each of hybrid modules 121-123 is a hybrid antenna module that is capable of operating as an antenna array in two or more separate antenna modes. Each of hybrid modules 121-123 is on a separate substrate from each other. Hybrid module 121 includes antenna array 101 and front-end 181. Some examples of hybrid modules 122 and 123 include similar components, but only hybrid module 121 is shown with an expanded view in FIG. 1. Front-end 180 includes power amplifier(s) 181 and impedance tuner 189. Each of hybrid modules 121-123 is capable of operating in two or more antenna modes, where the two or more antenna modes include at least two of: a mmWave mode, a UWB mode, a 60 GHz mode, a Bluetooth mode, or another suitable antenna mode. Each hybrid module operates in exactly one mode at any particular point in time but may change from one mode to another relatively quickly in some instances.

Outer layer 110 is composed of glass or another suitable material, such as a suitable plastic material. Outer layer 110 provides protection to hybrid modules 121-123 and possibly other sensitive components while providing minimal inference with the antenna signals radiated by hybrid modules 121-123. In some examples, for each of the hybrid modules 121-123, there is a gap between outer layer 110 and the hybrid module, such as a 0.5-millimeter air gap between outer layer 110 and the hybrid module. Chassis 140 provides protection and physical stability to the various components in device 100. Controller 130 and various other electronic components not shown in FIG. 1 are housed in chassis 140. Controller 130 controls hybrid modules 121-123, including control of which antenna mode each of the hybrid modules 121-123 is in.

In some examples, controller 130 includes: one or more processors executing software, a radio controller, and a radio front end. In some examples, the radio controller in controller 130 includes digital logic. In some examples, the radio front end in controller 130 includes analog logic that provides control to hybrid modules 121-123. In some examples, the radio front end in controller 130 includes at least one application specific integrated circuit (ASIC). The radio front end in controller 130 is capable of faster communication with hybrid modules 121-123 than software executing in controller 130. In some examples, controller 130 uses protocol stacks for control of RF communications, communication higher up the protocol stack is performed by software executing in controller 130, and communication lower in the protocol stack is performed by the radio front end in controller 130. For instance, there may be packet timing that occurs on the order of microseconds to milliseconds that is controlled by the radio front end in controller 130. The radio controller and the radio front end in controller 130 provide a variety of different functions, including radio functions, radio control functions, baseband processing functions, packet processing functions, and other suitable functions.

In some examples, the radio front end in controller 130 includes a separate module for each antenna mode, such as one module for mmWave and one module for UWB. In some examples, each radio controller in controller 130 also includes a separate module for each antenna mode. In this way, in some examples, controller 130 effectively includes a separate radio system/radio service for each antenna mode. For each antenna mode, the corresponding radio service has its own understanding of the protocol and the timing associated with its radio interface. When one of the hybrid modules changes operation from one antenna mode to another, the corresponding radio services in controller 130 communicate with each other to coordinate the change.

Although particular aspects of the architecture of controller 130 are discussed above and below in accordance with particular examples, in other examples, the architecture of controller 130 may differ from the discussion above and below in suitable ways. For instance, some examples of controller 130 are arranged in different ways than discussed above and discussed below. For instance, in some examples, controller 130 may be divided into separate devices in separate locations that are in communication with each other. Also, in some examples, some of the functionality discussed above and discussed below as being performed by a particular sub-component of controller 130 may instead be performed by a different sub-component of controller 130, or by a component outside of controller 130. For instance, in some examples, some of the functionality discussed above and discussed below as being performed by a particular sub-component of controller 130 may instead be integrated into the antennas of hybrid modules 121-123.

Although FIG. 1 shows an example of device 100 with three hybrid modules, in various examples, device 100 includes more or less than three hybrid modules. For instance, in some examples, device 100 includes exactly one hybrid module. In some examples, device 100 may include many hybrid modules that collectively provide a 360-degree contour of antenna communication around the device, or some portion thereof. In some examples, device 100 includes one hybrid module on the top of device 100 and two or more other hybrid modules each on a separate side of device 100.

Figure 2A:
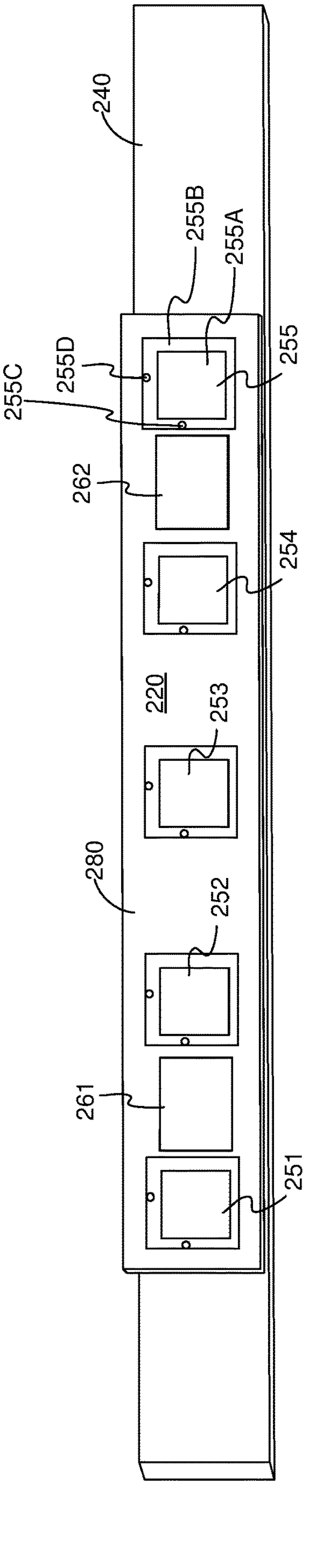
FIGS. 2A and 2B shows a block diagram of an example of a chassis and the hybrid antenna module of FIG. 1 operate in a millimeter wave (mmWave) mode and an ultra-wideband (UWB) mode respectively.
Figure 2B:
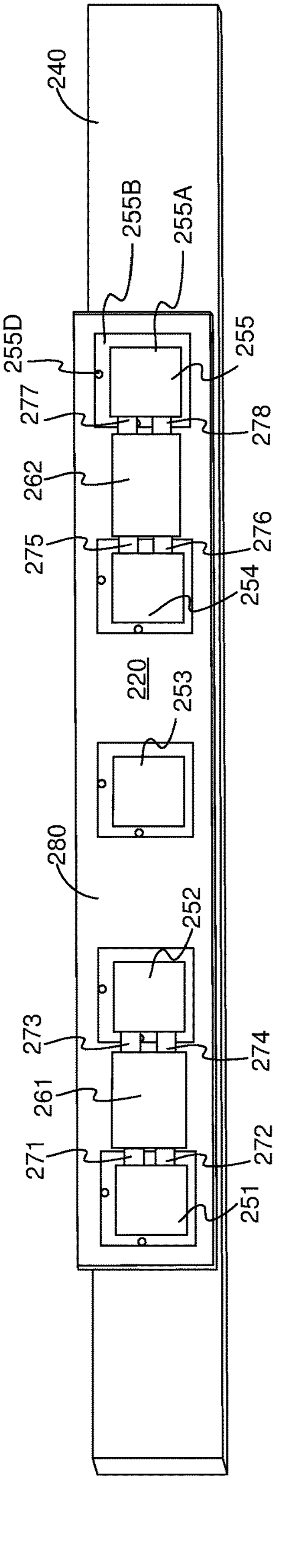

FIGS. 2A and 2B show an example of hybrid antenna module 220 and chassis 240. Hybrid antenna module 220 may be employed as an example of hybrid module 121, hybrid module 122, or hybrid module 123 of FIG. 1. In some examples, hybrid antenna module 220 is capable of selectively operating in mmWave mode and UWB mode. FIG. 2A shows an example of hybrid antenna module 220 operating in mmWave mode. FIG. 2B shows an example of hybrid antenna module 220 operating in UWB mode. In some examples, as illustrated in FIGS. 2A and 2B, hybrid antenna module 220 includes antenna patches 251-255, floating patches 261 and 262, switches 271-278, and antenna dielectric 280. Some examples of hybrid antenna module 220 are as follows.

Antenna dielectric 280 is a suitable dielectric material. In some examples, antenna dielectric 280 is a suitable low-loss plastic material having a loss tangent from about 0.002 to about 0.003 and a dielectric from about 2 to about 4. Floating patches 261 and 262 are utilized in UWB mode but are not utilized in mmWave mode. Switches 271-278 are open in mmWave mode and closed during UWB mode. Each of the switches 271-278 may be any suitable switch. For instance, in some examples, one or more of switches 271-278 may be a solid-state switch, a microelectromechanical system (MEMS) switch, or other suitable switch. Examples of a solid-state switch that may be used for one or more of switches 271-278 include a radiofrequency (RF) silicon-on-insulator (SOI) complimentary-metal-oxide-semiconductor (CMOS) switch, a Gallium Arsenide semiconductor switch, or another suitable solid-state switch. Each of the antenna patches 251-255 is a mmWave patch antenna that is configured to operate together as a phased array antenna. Floating patches 261 and 262 each act as a portion of an antenna in antenna modes in which one of more of switches 271-278 are closed. Each of the floating patches 261 and 262 is composed of copper or another suitable conductive material.

In some examples, one or more of the antenna patches (e.g., antenna patches 251-255) include one or more antenna components. For instance, in some examples, as shown in FIG. 2A and FIG. 2B, antenna patch 255 includes top patch layer 255A, patch element 255B, via 255C (not labeled in FIG. 2B), and via 255D. In some examples, top patch layer 255A and patch element 255B are separated by a portion of antenna dielectric 280. In some examples, via 255C and via 255D are ports that may be used to excite vertical and horizontal polarization, as discussed in greater detail below.

In other examples, vias 255C and 255D are vias that are connected to suitable control signal(s), suitable inputs signal(s), ground(s), or the like.

During mmWave mode, antenna patches 251-255 function as mmWave antenna patches. Each of the antenna patches 251-255 has one port that is used to excite vertical polarization during mmWave mode and another port that is used to excite horizontal polarization during mmWave mode. During antenna mmWave mode, antenna patches 251-255 are controlled to excite vertical polarization and horizontal polarization via the corresponding ports on antenna patches 251-255. During mmWave mode, antenna patches 251-255 are controlled to radiate in the 5G Frequency Range 2 (FR2) of 24.25 GHz to 52.6 GHz.

During UWB mode, switches 271-278 are closed. UWB requires larger antennas than mmWave. Accordingly, in order to have a hybrid module that is capable of both mmWave operations and UWB operation in one module on one substrate, in UWB mode, one UWB antenna is formed by closing switches to form one UWB antenna out of two antenna patches and one floating patch. More specifically, in the example of hybrid antenna module 220 illustrated in FIGS. 2A and 2B, the closing of switches 271-274 causes floating patch 261 to be coupled between antenna patches 251 and 252, so that antenna patches 251 and 252 are coupled to each other via floating patch 261.

In this way, antenna patch 251, floating patch 261, and antenna patch 252 act together as one UWB antenna. Similarly, the closing of switches 275-278 causes floating patch 262 to be coupled between antenna patches 254 and 255, so that antenna patches 254 and 255 are coupled to each other via floating patch 262. Antenna patch 254, floating patch 262, and antenna patch 254 act together as one UWB antenna. In this way, the closing of switches 275-278 causes the formation of two or more UWB antennas, where each UWB antenna is composed of two antenna patches and one floating patch, coupled together by switches 275-278.

In the examples illustrated in FIGS. 2A and 2B, there are two UWB antennas formed, which act together as a phased array antenna of two UWB antennas. During UWB mode, the UWB antennas are controlled at a resonant frequency in the range of 3.1 GHz to 10.6 GHz. For instance, in some examples, the UWB antennas are controlled to resonate at a frequency of about 7.98 GHZ. In each UWB antenna, the floating patch provides a conduction path for the input signal to go through during UWB mode.

FIGS. 2A and 2B show an example of hybrid antenna module 220 that includes five antenna patches, two floating patches, and eight switches. However, various examples of hybrid antenna module 220 may include more or less components than this. For instance, some examples of hybrid antenna module 220 may include many more than five antenna patches. Also, FIGS. 2A and 2B show an example of hybrid antenna module 220 that includes a one-by-five array of antenna patches. In some examples, hybrid antenna 220 may instead include a matrix array of antenna patches, such as a three-by-five array of antenna patches or a larger array of antenna patches. One example of antenna module 220 includes include a one-by-five array of antenna patches and is about 28 millimeters by 4 millimeters in size. Some examples of hybrid antenna module 220 with an array that is larger than one-by-five are correspondingly larger in size. The size may also vary in various examples based on many factors other than the number of patches, including, among other things, the precise technology used for the antennas.

FIGS. 2A and 2B show one particular example of hybrid antenna module 220 that is capable of selectively operating in two or more antenna modes. In the example hybrid antenna module 220 illustrated in FIGS. 2A and 2B, hybrid antenna module 220 is capable of selectively operating in mmWave mode or UWB mode. However, in general, hybrid antenna module 220 is capable in selectively operating among two or more different suitable antenna modes, where the different suitable antenna modes include: a mmWave mode, a UWB mode, a 60 GHz mode, a Bluetooth mode, or another suitable antenna mode.

Each of the hybrid antenna modules includes antenna patches, floating patches, and switches. For the antenna mode that requires the shortest wavelength antennas among the antenna mode used by the hybrid antenna module, the switches are open, and the antenna patches are the antennas for that mode. For instance, in examples in which the antenna mode that requires the smallest antennas among the antenna modes used by the hybrid antenna module is mmWave mode, the antenna patches are mmWave patch antennas. For each other mode, at least a portion of the switches are closed, and the antennas are formed so that each antenna is composed of at least two antenna patches and at least one floating patch.

Also, for each other mode, the antennas in the hybrid patch are controlled to operate at the resonant frequency that corresponds to the antenna mode that the hybrid antenna module is currently operating in. Also, for each other mode, for each of the antennas that comprise two or more antenna patches and one or more hybrid patches, the floating patch(es) provide a conduction path for the input signal to go through during that mode. The number of patches combined to form one antenna for each other mode depends on the size of the patches and the size of the antenna required for that mode.

Control for the switches and the antennas come from a controller, such as controller 130 of FIG. 1. Although not shown in FIGS. 2A and 2B, in some examples, hybrid antenna module 220 further includes one or more front ends, where each of the front ends includes one or more power amplifiers. The controller determines how the antennas are to be controlled, and the signals that go to the inputs of the antennas come from the output of the power amplifiers. In some examples, in hybrid antenna module 220, each of the different antenna modes has its own separate front end.

For instance, in some examples, hybrid antenna module 220 includes a mmWave front-end for the mmWave antenna mode that includes power amplifiers, where the outputs of the power amplifier are coupled to the input ports of the antenna patches 271-275 for which vertical polarization and horizontal polarization is excited. In some examples, hybrid antenna module 220 has exactly one combined front end that acts as a front end for each of the antenna modes, with the same set of power amplifiers being used for each of the antenna modes. In different antenna modes, different output matching may be required for the power amplifiers. In some examples, impedance tuning is used to adjust the output matching to provide different output matching in different antenna modes.

Returning to FIG. 1, an example of such a combined front end is shown in hybrid module 121. Front end 180 is a combined front end that is used for each of the antenna modes that hybrid module 121 operates in. Power amplifier(s) 181 are used in each antenna mode that hybrid module 121 operates in. Impedance tuner 189 adjusts the output matching to provide different output matching in each of the different antenna modes.

For each hybrid module (e.g., 121, 122, and 123), controller 130 controls which antenna mode the hybrid module is in at any particular time. In some examples, the determination as to which antenna mode a hybrid module is in is determined by arbitration logic in a software logic layer that executes in one or more processors in controller 130. In some examples, some parameters of the arbitration logic are user configurable. For instance, in some examples, a user is able to cause the arbitration logic to be configured to prioritize a particular antenna mode. For instance, in some examples, a user is able to cause the arbitration logic to be configured to prioritize mmWave mode over UWB mode or to prioritize UWB mode over mmWave mode. A user may be able to cause the arbitration logic to prioritize or deprioritize one or more antenna modes in different suitable ways in different examples.

In some examples, the arbitration logic causes the modes to be divided over time to share the hybrid module, such as by allowing the hybrid module to be in mmWave mode for a maximum time and then force the mode to be changed to UWB mode after the maximum time has elapsed, then run in UWB mode for one or more bursts of time such as about 11 to 13 milliseconds for each burst, and then return to mmWave made after the bursts are finished.

Controller 130 may determine whether coverage in a particular antenna mode is too weak for a particular hybrid module and may change the antenna mode if a mode running in a particular module is determined to have weak coverage at that time. Some examples of device 100 use multiple hybrid modules in different locations, and some modules may have better coverage than others based on their location. There are a number of different suitable criteria that controller 130 may use in various examples to determine that coverage is weak, performance is poor, or that there is an applicable related issue with a particular antenna mode for a hybrid module and that therefore the antenna mode of that hybrid module should be changed. For example, the controller may evaluate the throughput to determine how good the coverage for a particular antenna mode of a particular hybrid module. In some examples, if the antenna mode is changed for a hybrid module because the hybrid module is determined to have weak coverage for that antenna mode, controller 130 changes the antenna mode for that hybrid module back to the previous antenna mode if it is determined that the coverage is no longer weak.

In some examples, if controller 130 determines that coverage in a particular antenna mode is too weak for a particular hybrid module, controller 130 changes the antenna mode in that hybrid module to another antenna mode and does a handoff/transition to another hybrid module. For instance, in some examples, a seamless transition is provided from one hybrid module to another hybrid module so that a communications task being performed in one hybrid module is stopped for that hybrid module and seamlessly continued at another hybrid module from where that communications task left off. In this way, controller 130 performs a transition from use of one hybrid module in performing part of a communications task to use of another hybrid module in continuing that communications task. In some examples, when such a transition is performed, there is no interruption from the perspective of the network. The job is controlled by controller 130 both before and after the transition, but when the transition is complete, the communications task that was being performed via one hybrid module is continued via a different hybrid module.

Controller 130 controls the transition so that the transition occurs on packet boundaries. The transition is a soft transition rather than a hard transition. In some examples, when a transition occurs, the first hybrid module continues operation for a brief period of time, the second hybrid module operates in the same mode as the first hybrid module for a brief period of time so that there is a brief period of time in which both hybrid modules overlap, and then the first hybrid module stops operating in that mode, completing the transition. For beginning the operation of the second hybrid module in the same mode as the first hybrid module, controller 130 controls configuration the second hybrid module, then closes particular switches in the second hybrid module to prepare for the radio interface to be used, and then causes the operation to begin in the second hybrid module. In some examples in which multiple-input and multiple-output (MIMO) is used in mobile device 100, controlling the configuration of the second hybrid module includes controlling the allocation of MIMO resources to use the second hybrid module. The configuration of the second hybrid module also includes controlling the second hybrid module to configure the second hybrid module for its specific band of operation.

The transition occurs in a different manner depending on the whether the antenna mode is one in which beamforming is used or not. In antenna modes in which beamforming is used, such as mmWave mode, the transition is coordinated with a base station to which the hybrid module is transmitting. In antenna modes in which beamforming is not used, such as UWB mode, the transition is not coordinated with the base station, but instead the transition occurs within mobile device 100 itself. In examples in which the transition is coordinated with the base station, as part of controlling the configuration, controller 130 coordinates with the base station to determine when to perform the transition and to coordinate the beams in the transition of one hybrid module to another hybrid module.

In examples in which the transition is coordinated with the base station, the second hybrid module is locked onto a different beam than the first hybrid module. If the second hybrid module has previously communicated with the base station, the base station may already have the needed matrix information to change the beamforming over to the second hybrid module. If instead the second hybrid module has not previously communicated with the base station, a new beam search will be triggered for the second hybrid module.

By using one or more hybrid antenna modules (e.g., hybrid antenna module 121), device 100 can achieve a space savings relative to using separate modules for each different type of antenna array. For instance, using one hybrid module on one substrate that can selectively operate in either mmWave mode or UWB mode has a space savings compared to using one mmWave module that cannot operate as a UWB module on one substrate and another UWB module that cannot operate as a mmWave module on a separate substrate. Such a hybrid module can also allow for reduced internal routing, reduced transmission line losses, and less routing losses relative to separate modules.

Use of hybrid antenna modules (e.g., hybrid antenna modules 121, 122, and 123) enables more antenna functionality to be fit on device 100, allowing more radio connectivity using a smaller footprint.

Illustrative Processes

Figure 3:
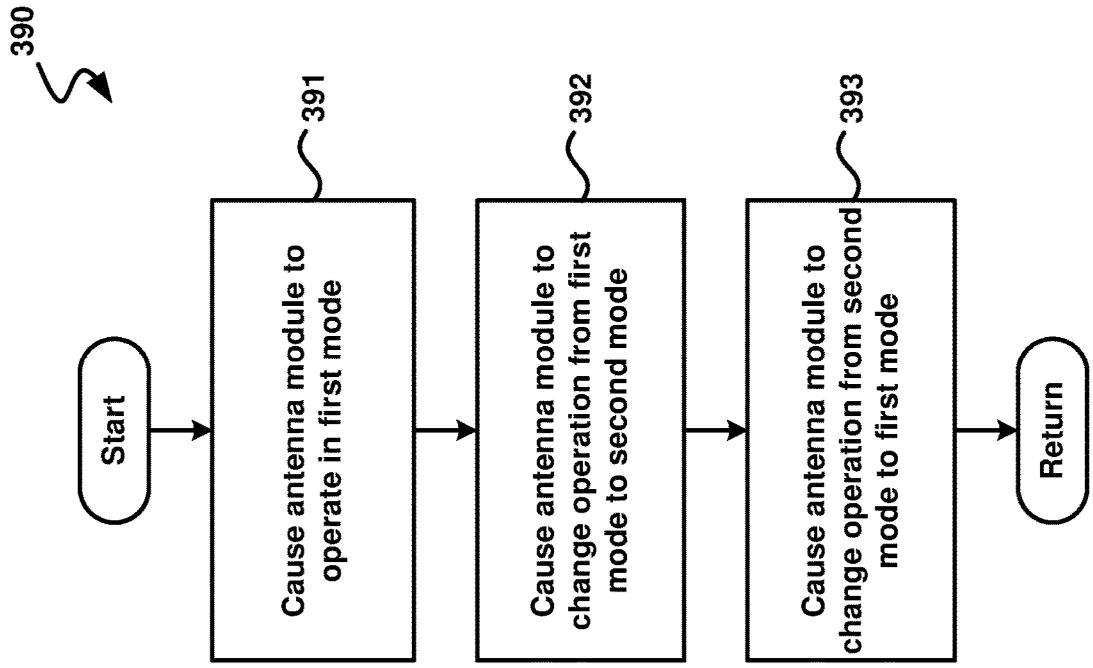
FIG. 3 is a flow diagram illustrating an example process for operation of a hybrid antenna array.

FIG. 3 is a diagram illustrating an example dataflow for a process (390) performed, such as by controller 130 of FIG. 1. In some examples, process 390 proceeds as follows.

Step 391 occurs first. At step 391, a first antenna module is caused to operate in a first mode. The first antenna module includes: a first plurality of antenna patches, a first plurality of floating patches, and a first plurality of switches. A resonant antenna frequency of the first antenna module is controlled at a first frequency in the first mode. As shown, step 392 occurs next. At step 392, the first antenna module is caused to change operation from the first mode to a second mode, such that at least a portion of antenna patches in the first plurality of antenna patches and at least a portion of the floating patches in the first plurality of floating patches are switched together via the plurality of switches in the second mode and not in the first mode, and in which a resonant antenna frequency of the first antenna module is controlled at a second frequency in the second mode. The second frequency is different from the first frequency. As shown, step 393 occurs next. At step 393, the first antenna module is caused to change operation from the second mode to the first mode. The process then advances to a return block, where other processing is resumed.

Illustrative Computing Device

Figure 4:
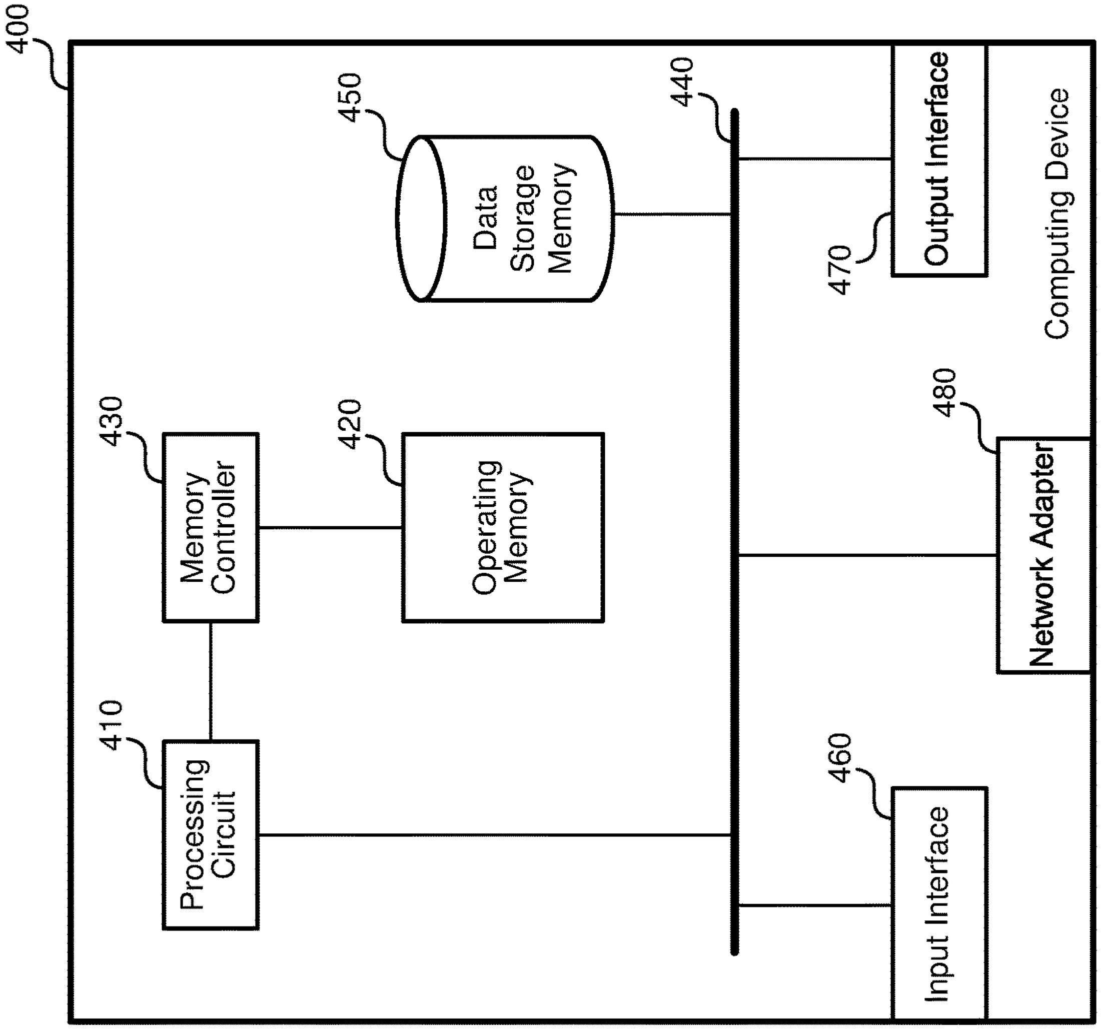
FIG. 4 is a block diagram illustrating one example of a suitable computing device, according to aspects of the disclosed technology.

FIG. 4 is a diagram illustrating one example of computing device 400 in which aspects of the technology may be practiced. Computing device 400 may be virtually any type of general- or specific-purpose computing device. For example, computing device 400 may be a user device such as a desktop computer, a laptop computer, a tablet computer, a display device, a camera, a printer, or a smartphone. Likewise, computing device 400 may also be a server device such as an application server computer, a virtual computing host computer, or a file server computer. In some examples, computing device 400 is a mobile device that is an example of mobile device 100 of FIG. 1 or mobile device 200 of FIG. 2. In some examples, the components illustrated in FIG. 4 are contained within chassis 120 of device mobile device 100 of FIG. 2 or chassis 220 device 200 of FIG. 2. As illustrated in FIG. 4, computing device 400 may include processing circuit 410, operating memory 420, memory controller 430, bus 440, data storage memory 450, input interface 460, output interface 470, and network adapter 480. Each of these afore-listed components of computing device 400 includes at least one hardware element.

Computing device 400 includes at least one processing circuit 410 configured to execute instructions, such as instructions for implementing the herein-described workloads, processes, and/or technology. Processing circuit 410 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 420 during run-time of computing device 400. Operating memory 420 may also include any of a variety of data storage devices/components, such as volatile memories, semi-volatile memories, random access memories, static memories, caches, buffers, and/or other media used to store run-time information. In one example, operating memory 420 does not retain information when computing device 400 is powered off. Rather, computing device 400 may be configured to transfer instructions from a non-volatile data storage component (e.g., data storage component 450) to operating memory 420 as part of a booting or other loading process. In some examples, other forms of execution may be employed, such as execution directly from data storage component 450, e.g., execute In Place (XIP).

Operating memory 420 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 410 via memory controller 430 in channels. One example of computing device 400 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above discussion, operating memory 420 specifically does not include or encompass communications media, any communications medium, or any signals per se.

Memory controller 430 is configured to interface processing circuit 410 to operating memory 420. For example, memory controller 430 may be configured to interface commands, addresses, and data between operating memory 420 and processing circuit 410. Memory controller 430 may also be configured to abstract or otherwise manage certain aspects of memory management from or for processing circuit 410. Although memory controller 430 is illustrated as a single memory controller separate from processing circuit 410, in other examples, multiple memory controllers may be employed, memory controller(s) may be integrated with operating memory 420, and/or the like. Further, memory controller(s) may be integrated into processing circuit 410. These and other variations are possible.

In computing device 400, data storage memory 450, input interface 460, output interface 470, and network adapter 480 are interfaced to processing circuit 410 by bus 440. Although FIG. 4 illustrates bus 440 as a single passive bus, other configurations, such as a collection of buses, a collection of point-to-point links, an input/output controller, a bridge, other interface circuitry, and/or any collection thereof may also be suitably employed for interfacing data storage memory 450, input interface 460, output interface 470, and/or network adapter 480 to processing circuit 410.

In computing device 400, data storage memory 450 is employed for long-term non-volatile data storage. Data storage memory 450 may include any of a variety of non-volatile data storage devices/components, such as non-volatile memories, disks, disk drives, hard drives, solid-state drives, and/or any other media that can be used for the non-volatile storage of information. However, data storage memory 450 specifically does not include or encompass communications media, any communications medium, or any signals per se. In contrast to operating memory 420, data storage memory 450 is employed by computing device 400 for non-volatile long-term data storage, instead of for run-time data storage.

Also, computing device 400 may include or be coupled to any type of processor-readable media such as processor-readable storage media (e.g., operating memory 420 and data storage memory 450) and communication media (e.g., communication signals and radio waves). While the term processor-readable storage media includes operating memory 420 and data storage memory 450, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 400 also includes input interface 460, which may be configured to enable computing device 400 to receive input from users or from other devices. In addition, computing device 400 includes output interface 470, which may be configured to provide output from computing device 400. In one example, output interface 470 includes a frame buffer, graphics processor, graphics processor or accelerator, and is configured to render displays for presentation on a separate visual display device (such as a monitor, projector, virtual computing client computer, etc.). In another example, output interface 470 includes a visual display device and is configured to render and present displays for viewing. In yet another example, input interface 460 and/or output interface 470 may include a universal asynchronous receiver/transmitter (UART), a Serial Peripheral Interface (SPI), Inter-Integrated Circuit (I2C), a General-purpose input/output (GPIO), and/or the like. Moreover, input interface 460 and/or output interface 470 may include or be interfaced to any number or type of peripherals.

In the illustrated example, computing device 400 is configured to communicate with other computing devices or entities via network adapter 480. Network adapter 480 may include a wired network adapter, e.g., an Ethernet adapter, a Token Ring adapter, or a Digital Subscriber Line (DSL) adapter. Network adapter 480 may also include a wireless network adapter, for example, a Wi-Fi adapter, a Bluetooth adapter, a ZigBee adapter, a Long-Term Evolution (LTE) adapter, SigFox, LoRa, Powerline, or a 4G adapter.

Although computing device 400 is illustrated with certain components configured in a particular arrangement, these components and arrangements are merely one example of a computing device in which the technology may be employed. In other examples, data storage memory 450, input interface 460, output interface 470, or network adapter 480 may be directly coupled to processing circuit 410 or be coupled to processing circuit 410 via an input/output controller, a bridge, or other interface circuitry. Other variations of the technology are possible.

Some examples of computing device 400 include at least one memory (e.g., operating memory 420) having processor-executable code stored therein, and at least one processor (e.g., processing unit 410) that is adapted to execute the processor-executable code, wherein the processor-executable code includes processor-executable instructions that, in response to execution, enables computing device 400 to perform actions, where the actions may include, in some examples, actions for one or more processes described herein.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:

a first substrate that includes a first antenna module, wherein the first antenna module includes:

a first antenna patch and a second antenna patch on the first substrate, wherein the first antenna patch and the second antenna patch are each discrete antenna elements in an antenna array;

a first floating patch on the first substrate; and a first plurality of switches on the first substrate; and a controller that is configured to cause the first antenna module to selectively operate in a first mode and a second mode, wherein:

in the first mode, the first antenna patch and the second antenna patch are each operable as discrete antenna elements at a first resonant frequency to form a first antenna array; and in the second mode, the first antenna patch and the second antenna patch are switched together with the first floating patch via the first plurality of switches to form a second antenna element operable at a second resonant frequency that is less than the first resonant frequency.

2. The apparatus of claim 1, wherein the first antenna patch and the second antenna patch are each discrete antenna elements in a phased array antenna.

3. The apparatus of claim 1, wherein the first mode is a millimeter wave mode, and wherein the second mode is an ultra-wideband mode.

4. The apparatus of claim 1, wherein the first antenna module includes:

a third antenna patch, and a fourth antenna patch;

a second floating patch; and a second plurality of switches;

wherein, in the second mode, the first antenna module has the second antenna element and a third antenna element; wherein the second antenna element includes the first antenna patch, the second antenna patch, and the first floating patch coupled between the first antenna patch and the second antenna patch via the first plurality of switches; and wherein the third antenna element includes the third antenna patch, the fourth antenna patch, and the second floating patch coupled between the third antenna patch and the fourth antenna patch via the second plurality of switches.

5. The apparatus of claim 1, wherein the controller is further configured to cause the first antenna module to selectively operate in a third mode such that one or more of the first, second, third, or fourth antenna patches and one or more of the first or second floating patches are switched together via one or more of the first or second plurality of switches in the third mode, and in which a resonant antenna frequency of the first antenna module is controlled at a third frequency in the third mode, wherein the third frequency is different from the first frequency, and wherein the third frequency is different from the second frequency.

6. The apparatus of claim 1, wherein the controller is further configured to evaluate a throughput of the first antenna module while the first antenna module is in the first mode and to cause the first antenna module to change operation from the first mode to the second mode based, at least in part, on the evaluated throughput of the first antenna module.

7. The apparatus of claim 1, wherein the controller is further configured to evaluate a throughput of the first antenna module while the first antenna module is in the second mode and to cause the first antenna module to change operation from the second mode to the first mode based, at least in part, on the evaluated throughput of the first antenna module.

8. The apparatus of claim 1, wherein the first antenna module further includes a hybrid front end that includes an impedance tuner and a plurality of power amplifiers, wherein the hybrid front end is arranged to provide first mode input signals to at least one of the first or second antenna patches while the first antenna module is operating in the first mode, the hybrid front end is arranged to provide second mode input signal to at least one of the first or second antenna patches while the first antenna module is operating in the second mode, and wherein the impedance tuner is arranged to adjust output matching of the hybrid front end based on which mode the first antenna module is operating in.

9. The apparatus of claim 1, wherein the controller is further configured to determine which mode the first antenna module should operate in based on arbitration logic, and wherein the arbitration logic includes at least one parameter that is user-configurable.

10. The apparatus of claim 1, wherein the first and second antenna patches are arranged in a matrix array to form a phased array antenna when operating the first mode.

11. The apparatus of claim 1, further comprising:

a second substrate that includes a second antenna module, wherein the controller is further configured cause the second antenna module to selectively operate in the first mode and the second mode.

12. The apparatus of claim 11, wherein the controller is further configured to perform a transition from use of the first antenna module in performing part of a first communications task to use of the second antenna module in continuing the first communications task.

13. The apparatus of claim 11, further comprising:

a third substrate that includes a third antenna module, wherein the controller is further configured to cause the third antenna module to selectively operate in the first mode and the second mode.

14. A method, comprising:

causing a first antenna module to operate in a first mode, wherein the first antenna module includes: a first antenna patch and a second antenna patch that are each discrete antenna elements in an antenna array, a first floating patch, and a first plurality of switches; wherein, in the first mode, the first antenna patch and the second antenna patch are each operable as discrete antenna elements at a first resonant frequency to form a first antenna array;

causing the first antenna module to change operation from the first mode to a second mode such that, in the second mode, the first antenna patch and the second antenna patch are switched together with the first floating patch via the first plurality of switches to form a second antenna element, wherein a resonant antenna frequency of the second antenna element controlled at a second resonant frequency in the second mode, wherein the second resonant frequency is different from the first resonant frequency; and causing the first antenna module to change operation from the second mode to the first mode.

15. The method of claim 14, wherein at least one of the first mode or the second mode is at least one of: a millimeter wave mode, an ultra-wideband mode, a 60 gigahertz mode, or a Bluetooth mode.

16. The method of claim 14, wherein the first mode is a millimeter wave mode, and wherein the second mode is an ultra-wideband mode.

17. The method of claim 14, wherein causing the first antenna module to change operation from the first mode to the second mode is based on a first determination that is made by arbitration logic, wherein causing the first antenna module to change operation from the second mode to the first mode is based on a second determination that is made by the arbitration logic, and wherein the arbitration logic includes at least one parameter that is user-configurable.

18. A processor-readable storage medium, having stored thereon processor-executable code that, upon execution by at least one processor, enables actions, comprising:

causing a first antenna module to operate in a first mode, wherein the first antenna module includes a first antenna patch and a second antenna patch, a first floating patch, and a first plurality of switches, and wherein, in the first mode, the first antenna patch and the second antenna patch are each controlled as discrete antenna elements to operate at a first resonant frequency to form a first antenna array;

determining whether the first antenna module should change operation from the first mode to a second mode;

responsive to determining that the first antenna module should change operation from the first mode to the second mode, causing the first antenna module to change operation from the first mode to a second mode, such that, in the second mode, the first antenna patch and the second antenna patch are switched together with the first floating patch via the first plurality of switches to form a second antenna element, wherein a resonant antenna frequency of the second antenna element is controlled at a second resonant frequency in the second mode, wherein the second resonant frequency is different from the first resonant frequency;

determining whether the first antenna module should change operation from the second mode to the second mode; and responsive to determining that the first antenna module should change operation from the second mode to the first mode, causing the first antenna module to change operation from the second mode to the first mode.

19. The processor-readable storage medium of claim 18, wherein at least one of the first mode or the second mode is at least one of: a millimeter wave mode, an ultra-wideband mode, a 60 gigahertz mode, or a Bluetooth mode.

20. The processor-readable storage medium of claim 18, wherein the first mode is a millimeter wave mode, and wherein the second mode is an ultra-wideband mode.

* * * * *